(12) United States Patent
Burns

(10) Patent No.: US 7,640,183 B1
(45) Date of Patent: Dec. 29, 2009

(54) ELECTRONIC COUPON PROCESSING SYSTEM

(76) Inventor: Dale Burns, 3105 Crooked Stick Dr., Plano, TX (US) 75093

( * ) Notice: Subject to any disclaimer, the term of this patent is extended or adjusted under 35 U.S.C. 154(b) by 2268 days.

(21) Appl. No.: 09/182,033

(22) Filed: Oct. 29, 1998

(51) Int. Cl.
 *G06Q 40/00* (2006.01)
(52) U.S. Cl. ....................................... 705/14
(58) Field of Classification Search ................ 705/1, 705/10, 14, 16, 21; 235/379–381, 383
 See application file for complete search history.

(56) References Cited

U.S. PATENT DOCUMENTS

| | | | | |
|---|---|---|---|---|
| 4,791,281 | A | | 12/1988 | Johnsen et al. ............... 235/383 |
| 4,882,675 | A | | 11/1989 | Nichtberger et al. ......... 364/401 |
| 5,008,519 | A | | 4/1991 | Cunningham et al. ....... 235/383 |
| 5,047,614 | A | | 9/1991 | Bianco ......................... 235/385 |
| 5,185,695 | A | | 2/1993 | Pruchnicki ................... 364/401 |
| 5,192,854 | A | | 3/1993 | Counts ......................... 235/375 |
| 5,287,181 | A | * | 2/1994 | Holman ........................ 348/473 |
| RE34,915 | E | * | 4/1995 | Nichtberger et al. ........... 705/14 |
| 5,665,953 | A | | 9/1997 | Mazzamuto et al. ......... 235/383 |
| 5,708,782 | A | * | 1/1998 | Larson et al. .................. 705/14 |
| 5,710,886 | A | | 1/1998 | Christensen et al. ......... 395/214 |
| 5,727,153 | A | | 3/1998 | Powell ......................... 395/214 |
| 5,745,681 | A | | 4/1998 | Levine et al. ............. 395/200.3 |
| 5,822,735 | A | * | 10/1998 | De Lapa et al. ................ 705/14 |
| 5,845,259 | A | * | 12/1998 | West et al. ...................... 705/14 |
| 5,855,007 | A | * | 12/1998 | Jovicic et al. .................. 705/14 |
| 5,903,874 | A | * | 5/1999 | Leonard et al. ................ 705/14 |
| 5,905,246 | A | * | 5/1999 | Fajkowski .................... 235/375 |
| 5,923,016 | A | * | 7/1999 | Fredregill et al. ............ 235/380 |
| 6,003,013 | A | * | 12/1999 | Boushy et al. ................. 705/10 |
| 6,012,038 | A | * | 1/2000 | Powell .......................... 705/14 |
| 6,035,280 | A | * | 3/2000 | Christensen ................... 705/14 |
| 6,151,587 | A | * | 11/2000 | Matthias ....................... 705/14 |

OTHER PUBLICATIONS

Adrienne Ward Fawcett, Trading Scissors for Modems, "The search to determine the redeeming value of online coupon delivery", pp. 2-3, Jun. 1995.*
NetValue Inc. "Welcome to netValue, Inc.", Bringing it All Home, pp. 1-2, Oct. 1997.*

* cited by examiner

*Primary Examiner*—Hani Kazimi
(74) *Attorney, Agent, or Firm*—The Marbury Law Group, PLLC

(57) ABSTRACT

A system and method for the electronic processing of discount coupons are described. The present invention comprises a coupon database containing coupon information that is associated with a specific consumer. The coupon database is operated in conjunction with a system for recording product information that is sold to a consumer at any particular store. The information from the register system is reconciled with information from the coupon database in order to give the consumer any credit for coupons that are attributed to his or her account. The coupon database is subsequently updated to reflect the transactions and the discounts given to the consumer. The consumer information, including both the information relating to coupons and the information relating to other products purchased, can be added to a database for marketing analysis. The store information relating to redeemed coupons is forwarded electronically to the manufacturers for rebate to the store.

18 Claims, 3 Drawing Sheets

ELECTRONIC COUPON PROCESSING SYSTEM

BACKGROUND

The present invention relates to the distribution, redemption, authentication, and clearing of coupons and the like. More particularly, the invention relates to a highly effective and efficient method and apparatus whereby coupons (such as cents-off merchandise coupons) can be redeemed, authenticated and cleared electronically.

Discount coupons (for example, "cents-off" coupons, rebate coupons, special offer coupons, or the like, collectively referred to herein as "coupons") have become an integral part and a popular means of marketing strategies for many products, particularly retail consumer goods, sundries, foodstuffs, hardware, clothing and the like. Such items are typically sold at local grocery, drug, and discount stores. Product manufacturers have come to rely upon coupons, rebate and gift certificates or the like to promote new and existing products, boost sales, and obtain demographic information concerning consumer buying patterns. Consumers use coupons to reduce costs.

For example, in 1992, approximately 310 billion coupons were distributed, with 7.7 billion coupons redeemed, saving consumers approximately 4 billion dollars. It has been estimated that coupons, coupled with advertising, can increase sales by as much as 500%. A typical coupon marketing scheme involves printing the coupons in the newspaper or inserting coupon inserts into the newspaper, and allowing consumers to bring the printed coupons to a store for redemption. Other means of distributing coupons include printing or inserting in magazines, or other publications, by direct mail methods, and on products distributed at retail establishments.

Known couponing techniques have several drawbacks, not the least of which are low response rate, fraud, and high administrative processing costs. Low response rates are due in part to the difficulty a consumer has in maintaining, cataloging, and finding appropriate coupons before or during shopping. Moreover, since many coupons have expiration dates, a consumer has to not only catalogue each coupon by its product type, but also catalogue the coupons to ensure that redemption occurs before an expiration date. Since such techniques are time-consuming and cumbersome, the response to coupon campaigns has been limited to consumers who are on a budget or consumers who use coupons as a hobby. Accordingly, there is a need in the industry to simplify the process of coupon use by increasing the response rates, while at the same time, reducing consumer management time and lowering the administrative costs of processing the coupons after they are tendered.

In coupon redemption, fraud can happen on two fronts. Fraud may occur when coupons are duplicated using state of the art color photocopiers. On the other hand, fraud can be committed by vendors or merchants that accept such coupons or participate in submitting duplicated coupons to the manufacturers for rebates without the underlying sales.

In addition, known coupon redemption techniques yield little, if any, useful data to product manufacturers regarding who is redeeming such coupons. Consumer demographic data is extremely valuable to a product manufacturer in determining which products to target to particular consumer groups (e.g., through particular advertising venues). Moreover, the manufacturer is stymied since such demographic data is unavailable to permit more efficient distribution of future coupons. Information relating to the buying habits such as frequency and monetary value of products purchased, and demographics of particular consumers or groups of consumers has tremendous market value. Such information could also be sold or traded for a profit.

Additionally, known techniques of couponing require substantial involvement by the consumer rather than decreasing the time a consumer spends in redeeming coupons. Furthermore, the known techniques require that consumers carry the coupons or the instruments containing coupon information each time they visit a participating store for their purchases. Therefore, there is a need for a coupon processing system that reduces the time a consumer spends handling the coupons. There is a further need for a coupon handling system that captures detailed data about consumers' habits that can be provided to a manufacturer to create better value of products and newer products to the consumer.

SUMMARY

It is therefore an object of the present invention to improve consumer response to coupon distribution campaigns.

It is a further object of the present invention to create store loyalty due to the database that is maintained at the store(s) location.

It is a further object of the present invention to provide more accurate data regarding which consumers redeem particular coupons in a coupon distribution campaign.

It is a further object of the present invention to provide additional demographic data correlated to consumer and coupon redemption for a coupon distribution campaign.

It is a further object of the present invention to reduce the incidence of fraud in the redemption of coupons or copying of coupons.

It is a further object of the present invention to improve consumer response to a coupon campaign by targeting consumers with specific coupon product lines in response to demographic data generated from previous coupon campaigns and transactions.

It is a further object of the present invention to reduce the time required by a consumer in order to utilize coupons at any particular store or combinations of stores.

It is a further object of the present invention to provide a method for identifying the location of certain products in a particular store based on the information in the coupon database relating to a specific consumer.

It is a further object of the present invention to save time at checkout by not requiring coupon scanning at a checkout register.

The present invention is an electronic coupon processing system and method that meets the above stated objectives. The present invention comprises a coupon database containing coupon information that is associated with a specific consumer. This coupon database is operated in conjunction with a system for recording information concerning products that are purchased by a consumer at a particular store. Using the new generation of bar code scanning registers, the information from the register system is reconciled with information from the coupon database in order to give the particular consumer credit for coupons that are attributed to his or her account. The coupon database is subsequently updated to reflect the transactions and the discounts given to the consumer. The consumer information, including both the information relating to coupons and the information relating to products purchased, can be added to a database for marketing analysis. This consumer information would be associated with a particular consumer. The compilation of this information for various consumers at any store provides invaluable data that can be used to improve products or marketed independently.

The information generated for each consumer at the register when the consumer makes his or her purchases and the coupon database reconciliation is then be forwarded electronically to the manufacturers for rebates to the vendor.

In use, a particular consumer "clips" or acquires coupons and brings them in to a particular store for scanning or other means of entry into the coupon database. The coupon data entry can be performed by the consumer or by the store. If the scanning devices are located at the store, a higher sophistication level can be added, as compared to providing a scanning mechanism to each individual consumer.

These and other features, aspects and advantages of the present invention will become better understood with reference to the following description, drawings, and appended claims.

DESCRIPTION

Figure 1:
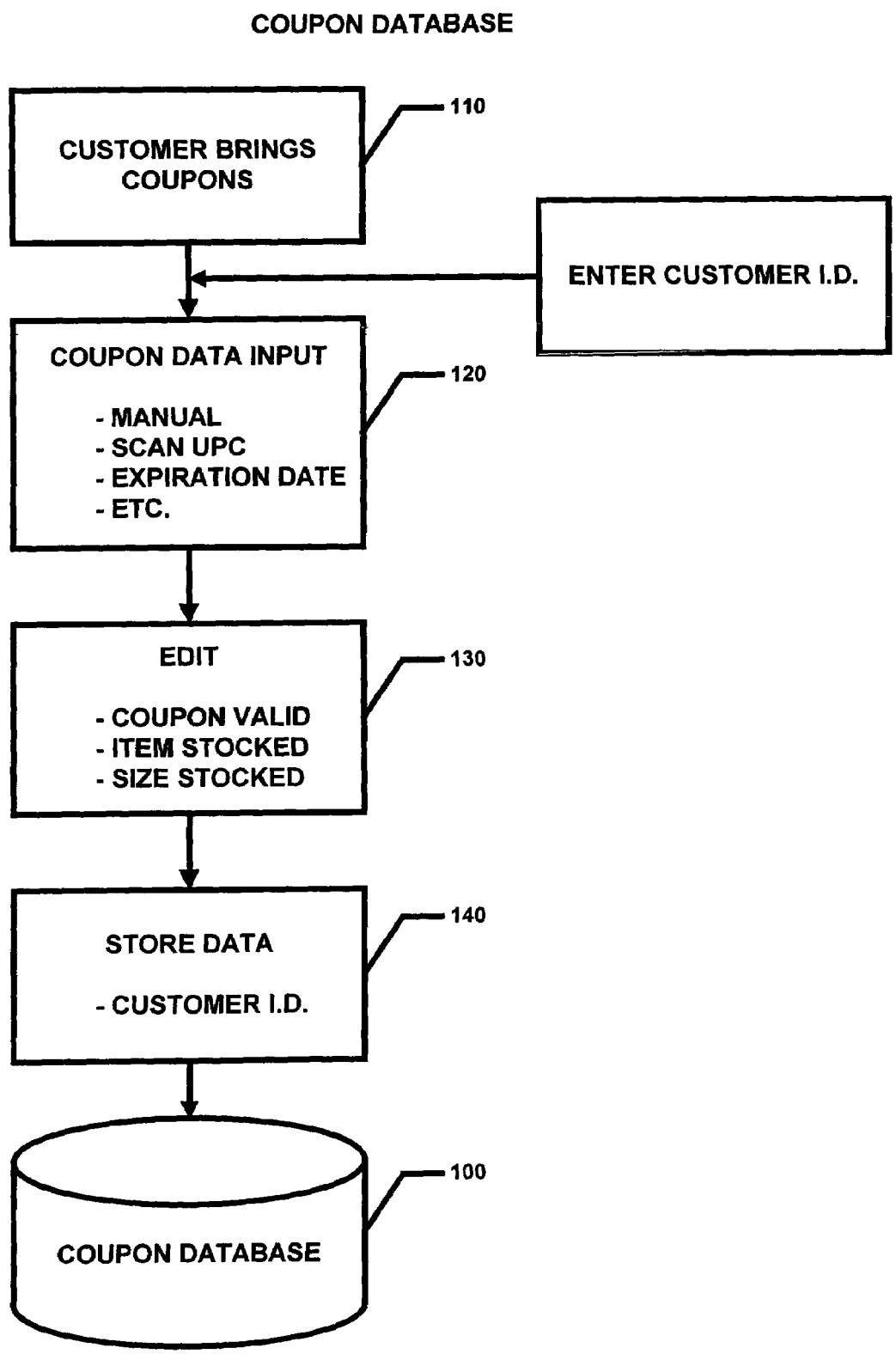
FIG. 1 shows a scheme for the operation of a coupon database in accordance with a version of the present invention.

The present invention is described below in connection with the selection, distribution or redemption of coupons in a store such as a supermarket, grocery store, specialty food store, drug store, office supply store, discount clubs, or any other institution that offers coupons to or accepts coupons from its consumers. The term coupons, as used herein, shall mean any mode of communication with a consumer or a potential consumer offering a specific discount to the consumer wherein the consumer needs to bring such proof back to a store for redemption. The most commonly used coupons are the "cents-off" merchandise coupons. Other common coupons are "two for one," buy one product and get another product for free or at a discount, and the like. Sometimes coupons are not strictly related to a discount on pricing. Coupons can offer some other advantage to the consumer, such as the ability to buy a product that is in demand or a collectible. Information found on coupons in general relate to the particular product, manufacture, the size of the product, the type of product, other products included or required for the discount, quantity, discount amounts, validity dates, expiration dates, any limitations on the number of items per coupon, and the like. It is common today to encode all of the above detailed information on a coupon in a bar code that is easily readable by a participating store.

In accordance with the present invention, the electronic coupon processing system comprises a coupon database containing coupon information that is attributed to a specific consumer. The database can be built through manual entry although it is preferred that electronic scanning means be used. One of the options contemplated by the present invention is that a consumer selects the coupons and brings them to a data processing center in the store or at any other convenient location. At the processing center, the coupon information is entered into the database and attributed to the particular consumer. Based on technology available today, one of the easier means of entry of the data would be through scanners that would read the barcodes off the coupons. Manual entry of the information is also contemplated. The important factor is that the coupon data is entered into a database and attributed to a particular account for a particular consumer.

At the time of entry of the information into the database, appropriate steps to eliminate fraud can be included. This can be achieved by either human review of the coupons or machine review, or both. It is more economic to utilize sophisticated scanning equipment at a processing center when compared to providing consumers with individual scanners. The store or coupon center scanners are maintained and optionally operated by skilled workers. As compared to providing a scanner to each consumer, the number of scanners at a store or coupon center are fewer and can be more sophisticated with a lower overall cost. Editing of the information can also be performed, for example, to reject coupons for products not carried by the participating store or stores.

Consumer identification can be made through the utilization of various codes to be entered at the time the coupons are scanned or entered. Such means can be through the use of manual entry of specific codes or other electronic means that identify the consumer. For example, various stores provide a "frequent shopper" type card that contains detailed information identifying each consumer. The utilization of pin (personal identification numbers), or magnetic cards are common in the industry.

As indicated earlier, the processing center can be utilized by one store or various stores. For example, various stores in a shopping center can participate in the utilization of one common coupon database. Additionally, various stores that are either affiliated or form some sort of consortium, can participate in the utilization of a common coupon database, for example, a chain of supermarkets.

It is contemplated in accordance with the present invention that the consumer would have access to the coupon database in order to review the information contained therein. This review can be at a particular store, where the consumers are able to print out the available coupons for their account and the location of the particular products at the store. For example, at a grocery store, a particular consumer prints out the data from the coupon database and the store can then include the particular aisle location for each of the products that it carries matching the information in the coupon database. This simplifies the use of the coupon and encourages shopper to easily purchase particular items. Additionally, it is contemplated by the present invention that a consumer is able to review the information in his/her account in the coupon database at home via access to the database whether by the Internet, a diskette update, or any other communications from the store. For example, a store can mail to a consumer a periodic summary of the information on a regular basis and may include other promotions or coupons that have already been entered into the system based on the market information collected for that consumer. Other means of displaying the coupon database information, product location or both can be utilized.

At the time a consumer completes the products selection and is ready to pay for the selected products, some sort of register or other means is utilized to input product information. At the time of checkout, this purchase information is attributed to the specific consumer. The same means of identifying the consumer, as utilized at the time the coupons are entered into the coupon database, may be utilized (i.e. the consumer token or card). Different means may also be utilized as long as the data on the product purchased by the consumer can be tied into the information associated with that consumer in the coupon database.

A comparison of the purchased product information is made with the coupon database for reconciliation. If any coupons are available, the consumer is able to receive immediate notification and an automatic discount if applicable. The coupon database is subsequently updated to reflect the concluded transaction with a consumer.

The system automatically performs daily checks in order to remove expired coupons from the consumer's account. Additionally, a consumer profile can be generated or updated to show the products purchased, with or without coupons, coupons used, prices or amounts spent, dates, locations, and the like. The redeemed coupons' information is sent directly to the manufacturer in the form of a hard copy or in an electronic form for redemption by the vendor. Register information can be added as proof of purchase, facilitating audit by the manufacturer and significantly reducing the amount of fraud attributed to the submission of coupons without any underlying sales.

Using the system of the present invention, clearinghouses can be bypassed and the coupon information can be sorted electronically and sent to the particular manufacturer for reimbursement to the vendor. This saves significant cost associated with any coupon clearinghouse operation.

FIG. 1 illustrates one embodiment of the present invention showing the operation and creation of a coupon database 100. The consumer brings the coupons 110 to a coupon processing center. The coupon processing center may be located in the store, outside the store, or at any other remote location. The data on the coupons is input at the coupon processing center with the entry of the consumer identification. The data input 120 may be done manually or electronically, such as by scanning the UPC barcodes. The data includes, but is not limited to, the product type, size, expiration date of the coupon, amount of discount, special conditions and the like. Subsequently, the coupon data can be edited 130 and analyzed. For example, the validity of the coupons can be checked and the coupons can be compared to the items stocked at the store. The coupon data is subsequently stored 140 and associated with the consumer ID in the database 100.

Figure 2:
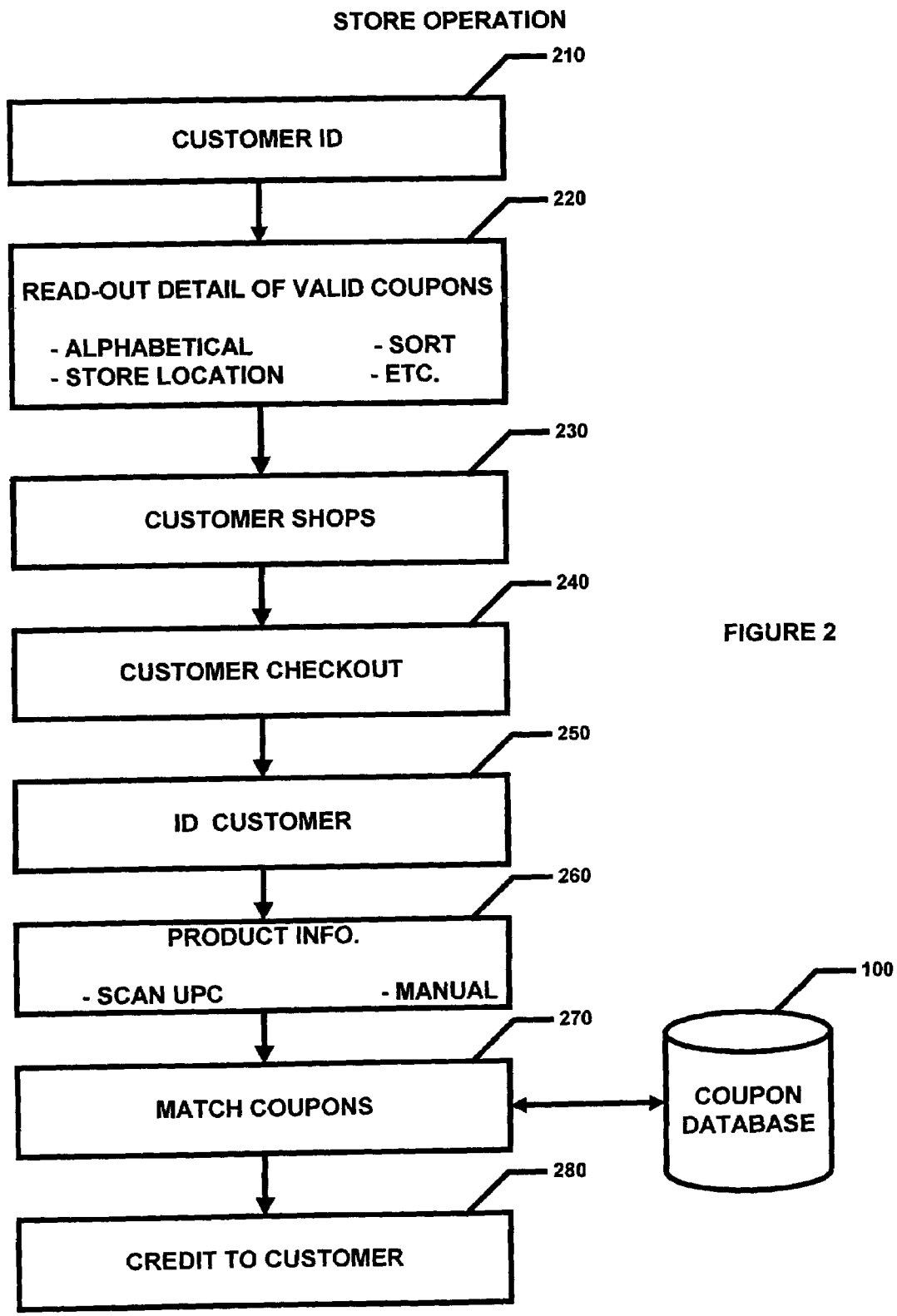
FIG. 2 is a schematic of a store operation in accordance with a version of the present invention.

FIG. 2 illustrates the in-store operations of the present invention. As shown in the diagram, the consumer shows an ID 210 at the time the coupons are brought to the coupon processing center. After the coupon data is input into the coupon database, a readout is given to the consumer 220. For example, the readout can be sorted alphabetically, by store location, by product type, by aisle location, or in any other desired manner. This readout is intended to assist the consumer during shopping 230 by locating products for which the consumer had matching coupons. At the consumer checkout 240, the consumer ID is input into the cash register 250. After the consumer ID, the product information is input into the register 260. This input can be done manually but is preferably done with the assistance of a UPC scanner. The register then communicates with the coupon database in order to match the products being purchased with the coupons in the consumer's account 270. As shown in block 280, credit is instantly given to the consumer at the cash register. Additionally, the coupon database is updated to deduct the coupon information that is utilized at the cash register.

Figure 3:
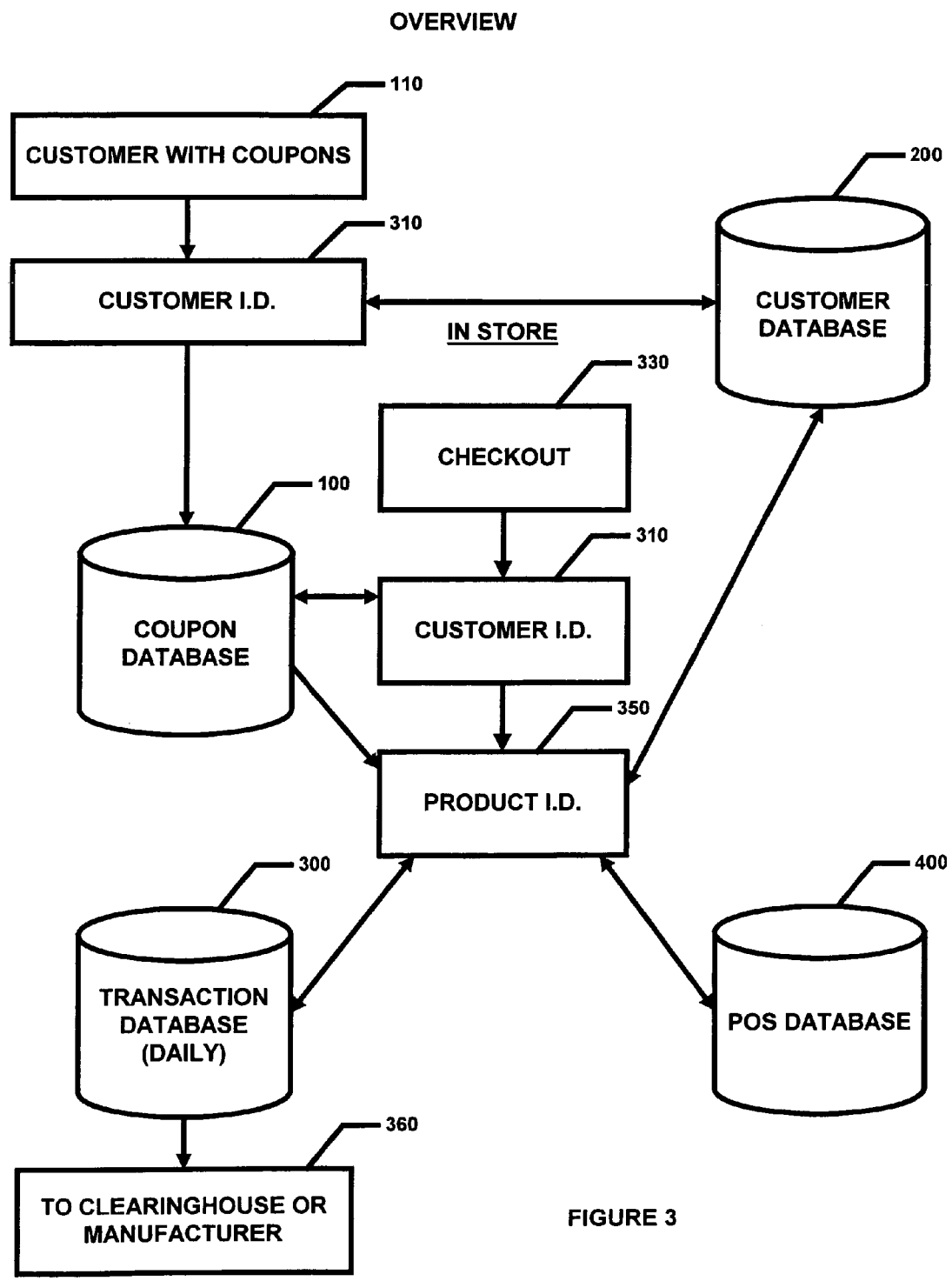
FIG. 3 is a schematic overview of a coupon redemption system and process in accordance with an embodiment of the present invention.

FIG. 3 illustrates the architecture of an embodiment of the present invention. In accordance with this embodiment, the consumer brings the coupons to a coupon processing center 110. The coupon information and the consumer ID are input into a coupon database 100 and a consumer database 200. At the checkout 330, the consumer ID 310 is again input into the register using the consumer token or card. The input of the consumer ID triggers communication with the coupon database 100 to check the account of the consumer for coupon information stored therein. At the cash register, product identification is also input 350. The input of the product information triggers communication with the point of sale database 400 and the transaction database 300. The consumer is then given instant credit at the cash register.

At the conclusion of the transaction, the cash register information is processed to the various databases. The coupon database 100 is updated to remove used coupons from the account of the consumer. Additionally, the consumer database 200 is updated to store the consumer information, again triggered by the consumer ID, relative to the types of products purchased with and without coupons. The point of sale database 400 is also updated for store information.

Another database, the transaction database, is also updated to show the coupons utilized and the related sold products. This transaction database can include tamper resistant measures to preserve the integrity of the cash register information including the consumer identification, product identification, and coupon database information. Since the information is reflective of actual transactions, this data is forwarded to a clearinghouse or manufacturer for refunds to the store. The security or tamper resistant measures on the transaction database would eliminate possibilities of fraud, since the information would be based on actual cash register information and automatically updated.

An advantage of the present invention is that a consumer's habits are not changed. Coupon consumers can continue to collect coupons in whatever method they deem appropriate. Consumers can continue to clip coupons from any newspaper, collect coupons from inserts, receive coupons by electronic means, or any other method. Modification of the behavior of the consumer is not necessary. Indeed, such behavior is encouraged by simplification of the coupon redemption process.

Another advantage of the present invention is that the time spent by consumers in managing their coupons is reduced. By depositing the coupons at the store or any other center for entry into the coupon database, the consumer eliminates the need (a) to carry all of the coupons every time they shop or go to any participating store, (b) to check which coupons are still valid, or (c) to look for the applicable coupons at the checkout register. This also saves time for the store at the checkout register. Both consumer and store operations benefit from reduced time at the checkout register.

Another advantage of the present invention is the creation of store loyalty. Since the consumer has a coupon database at a particular store or group of stores, the consumer would frequent these stores as opposed to one without the database.

Another advantage of the present invention is that the coupon/product reconciliation is done automatically. This reduces the chances for fraud and error. Since the register information is used to give the coupon discount, both register and coupon information can be sent to the clearinghouse or directly to the manufacturer for reimbursement to the participating store.

Yet another advantage of the present invention is that information relating to the consumer is retained for future use. Useful information includes the coupons redeemed by a consumer, products purchased with or without coupons, frequency of purchases, dollars spent, relationship of purchases, and the like. A whole industry is built on providing consumer lists. Consumer lists with purchasing information is even much more desirable. Based on this information, various market analysis studies can be performed.

Although the present invention has been described in considerable detail, with reference to certain preferred versions thereof, other versions are possible. Therefore, the scope of the appended claims should not be limited to the description of the preferred versions contained herein. Accordingly, departures may be made from such details without departing from the scope of applicant's general invented concept. The invention is defined in the following claims.

The invention claimed is:

1. An electronic coupon processing system for eliminating a presentation of printed coupons at a checkout register, comprising: a plurality of consumer identification means wherein each consumer identification means is associated with a consumer; a plurality of consumer accounts associated with said plurality of consumer identification means; a database for storing information for each of said plurality of consumer accounts; at least one means separate from a checkout register for each consumer to enter unutilized coupon information from printed coupons in the consumer's possession into said associated consumer account based on input of the consumer's consumer identification means so as to eliminate any need to present printed coupons at a checkout register; at least one checkout register capable of collecting a consumer's purchase information, said register additionally being connected to said database; means associated with said checkout register for reconciling the unutilized coupon information in each consumer's consumer account with the consumer's purchase information based solely on input of said consumer's consumer identification means; and means for updating said consumer's consumer account to reflect utilization of coupons, wherein said at least one means for each consumer to enter unutilized coupon information from printed coupons is the only means provided for consumers to add unutilized coupon information into their consumer account, the system includes means to add unutilized coupon information directly to consumer accounts; and means for providing Internet review of unutilized coupon information in a consumer's consumer account based on input of said consumer's consumer identification means.

2. The electronic coupon processing system of claim 1, wherein a consumer's frequent shopper card comprises said consumer identification means.

3. The electronic coupon processing system of claim 1, wherein additional unutilized coupon information is added to a consumer account by the system based on market information collected for a consumer associated with said consumer account.

4. The electronic coupon processing system of claim 1, wherein said database is connected to registers at a particular store or group of stores.

5. The electronic coupon processing system of claim 1, wherein said at least one means for each of said plurality of consumers to enter unutilized coupon information from printed coupons in their possession consists of a scanner.

6. The electronic coupon processing system of claim 5, wherein said scanner is located in a store and said store further includes means for viewing and a printer for providing a printout of unutilized coupon information in a consumer's consumer account based on input of said consumer's consumer identification means.

7. The electronic coupon processing system of claim 4, wherein said printout includes an aisle location for products associated with said coupon information in said consumer account.

8. The electronic coupon processing system of claim 1, wherein said means for reconciling automatically sends both purchase information and coupon information directly to a clearinghouse or a manufacturer for reimbursement.

9. The electronic coupon processing system of claim 1, further comprising means to provide a printout of unutilized coupon information in a consumer's consumer account.

10. An electronic coupon process for eliminating a presentation of printed coupons at a checkout register, comprising: a system associating a plurality of consumers with a plurality of consumer identification means; the system associating a plurality of consumer accounts with said plurality of consumer identification means; the system storing information for each of said plurality of consumer accounts in a database; entering, at a location separate from a checkout register, unutilized coupon information from printed coupons in a consumer's possession into said associated consumer account based on input of said consumer's consumer identification means to eliminate any need to present printed coupons at a checkout register; collecting said consumer's purchase information at a checkout register that is connected to said database; reconciling the unutilized coupon information in said consumer's consumer account with the purchase information based solely on input of said consumer identification means of said specific consumer; and updating a consumer account of said consumer to reflect utilization of coupons, wherein consumers are limited to adding unutilized coupon information into their consumer account solely from printed coupons in their possession, the system can add unutilized coupon information directly to consumer accounts; and providing Internet review of unutilized coupon information in a consumer's consumer account based on input of said consumer's consumer identification means.

11. The electronic coupon process of claim 10, wherein a consumer's frequent shopper card is used as said consumer identification means.

12. The electronic coupon process of claim 10, further comprising adding additional unutilized coupon information to a consumer account based on market information collected for a consumer associated with said consumer account.

13. The electronic coupon process of claim 10, further comprising connecting said database to registers at a particular store or group of stores.

14. The electronic coupon process of claim 10, further comprising entering unutilized coupon information from printed coupons using a scanner.

15. The electronic coupon process of claim 14, further comprising locating said scanner in a store and said store further providing means for viewing and a printer for providing a printout of unutilized coupon information in a consumer's consumer account based on input of said consumer's consumer identification means.

16. The electronic coupon process of claim 15, further comprising printing out an aisle location for products associated with said coupon information in said consumer account.

17. The electronic coupon process of claim 10, wherein reconciling automatically sends both purchase information and coupon information directly to a clearinghouse or a manufacturer for reimbursement.

18. The electronic coupon process of claim 10, further comprising providing a printout of unutilized coupon information in a consumer's consumer account.

* * * * *